(12) United States Patent
Stampfli

(10) Patent No.: US 7,889,494 B2
(45) Date of Patent: Feb. 15, 2011

(54) PORTABLE ELECTRONIC DEVICE HOLSTER WITH GUIDED DOCKING STATION

(76) Inventor: Urs Stampfli, 965 Crestview Cir., Weston, FL (US) 33327

( * ) Notice: Subject to any disclaimer, the term of this patent is extended or adjusted under 35 U.S.C. 154(b) by 88 days.

(21) Appl. No.: 12/488,173

(22) Filed: Jun. 19, 2009

(65) Prior Publication Data

US 2010/0312938 A1 Dec. 9, 2010

Related U.S. Application Data

(60) Provisional application No. 61/183,824, filed on Jun. 3, 2009.

(51) Int. Cl.
G06F 1/16 (2006.01)
(52) U.S. Cl. .................. 361/679.42; 224/663; 455/573; 312/334.15; 320/103
(58) Field of Classification Search .................. 224/196, 224/681, 663, 673, 661; 455/575.1, 90.3, 455/573; 248/304, 206.4; 361/679.58, 679.31, 361/679.4, 679.33, 679.21, 679.32, 679.37, 361/679.34, 679.47, 679.38, 679.48; 312/216, 312/334.6, 334.12, 334.15, 238; 320/101, 320/114, 115, 103; 710/303; 708/173
See application file for complete search history.

(56) References Cited

U.S. PATENT DOCUMENTS

| | | | | |
|---|---|---|---|---|
| 5,331,580 | A * | 7/1994 | Miller et al. | ................. 708/173 |
| 5,801,512 | A | 9/1998 | Adams et al. | |
| 5,898,932 | A | 4/1999 | Zurlo et al. | |
| 6,131,018 | A | 10/2000 | De Crouy-Chanel et al. | |
| 6,184,654 | B1 | 2/2001 | Bachner, III et al. | |
| 6,476,311 | B1 | 11/2002 | Lee et al. | |
| 6,870,089 | B1 | 3/2005 | Gray | |
| 6,977,479 | B2 | 12/2005 | Hsu | |
| 7,295,865 | B2 | 11/2007 | Wang | |
| 2002/0088486 | A1 | 7/2002 | Chen | |
| 2003/0096642 | A1 | 5/2003 | Bessa et al. | |
| 2004/0204179 | A1 | 10/2004 | Hsu | |
| 2005/0225281 | A1 | 10/2005 | Redl | |
| 2005/0282591 | A1 | 12/2005 | Shaff | |
| 2006/0058073 | A1 | 3/2006 | Kim | |
| 2007/0064385 | A1 * | 3/2007 | Paul et al. | ................... 361/687 |

(Continued)

OTHER PUBLICATIONS iPhone 3G Charging Case, Apple Inc., www.iclarified.com/entry/index.php?enid=1627, Aug. 5, 2008.

(Continued)

*Primary Examiner*—Hung V Duong
(74) *Attorney, Agent, or Firm*—Novak Druce LLP

(57) ABSTRACT

A holster provides a carrier for removable storing a portable electronic device, such as a cellular phone, PDA or MP3 player, and a fastener for securing the carrier to the user's clothing or bag. The holster includes a docking station inside the carrier and a pair of guide rails extending from the docking station to guide a device into electrical contact with the docking station. The docking station and rails are preferably pivotally mounted to the carrier to that they can be pivoted for convenient and easy insertion and removal of a device from aligned contact with the docking station. The dock equipped holster can then provide several power supply options for the user, including solar cells along an exterior surface of the carrier, wireless charging tags or pass through power cord ports, as well as data port and audio port pass through.

20 Claims, 10 Drawing Sheets

U.S. PATENT DOCUMENTS

| | | |
|---|---|---|
| 2008/0125188 A1 | 5/2008 | Huang |
| 2008/0157712 A1 | 7/2008 | Garcia |
| 2008/0200221 A1 | 8/2008 | Lockwood |
| 2008/0268916 A1 | 10/2008 | Lin et al. |
| 2008/0270664 A1* | 10/2008 | Carnevali .................... 710/303 |
| 2009/0023481 A1 | 1/2009 | Foster et al. |
| 2009/0054110 A1 | 2/2009 | Tseng |
| 2009/0058353 A1 | 3/2009 | Jung |
| 2009/0111501 A1 | 4/2009 | Tang et al. |

OTHER PUBLICATIONS

Krikke, Sunrise for Energy Harvesting Products, Pervasive Computing, Jan.-Mar. 2005, pp. 4-8.

Silicon Solar, Inc., www.siliconsolar.com/pda-solar-battery-chargers, Apr. 28, 2009.

Solar-powered cellphones, Emerging Technology Trends, ZDNet.com, posted by Roland Piquepaille, http://blogs.zdnet.com/emergingtech/?p=563, Apr. 27, 2009.

G24 Innovations, Flex Series, solar phone chargers, http://g24i.com/pages,products,40.html, Apr. 28, 2009.

* cited by examiner

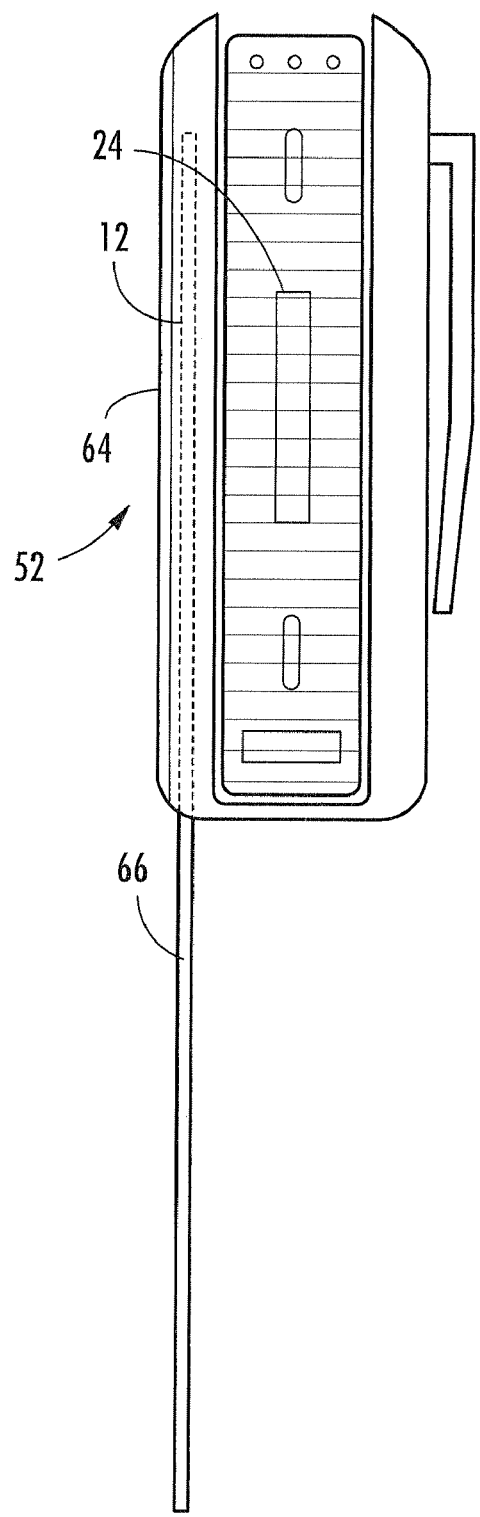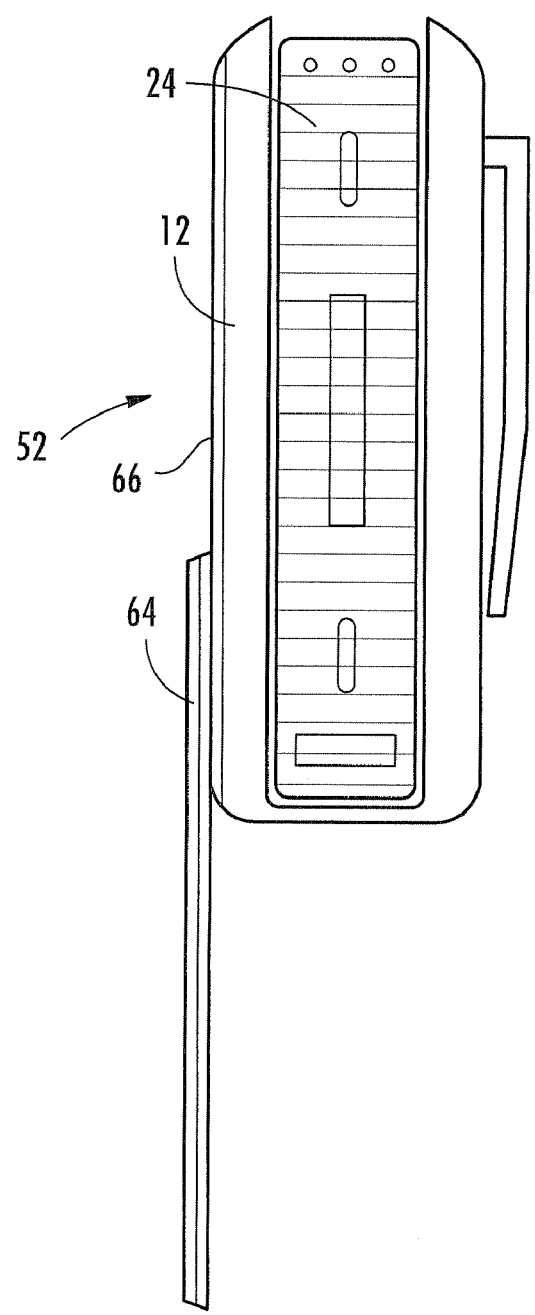
FIG. 6
FIG. 7

PORTABLE ELECTRONIC DEVICE HOLSTER WITH GUIDED DOCKING STATION

CROSS-REFERENCE TO RELATED APPLICATION

This application claims the benefit of U.S. Provisional Application Ser. No. 61/183,824, filed Jun. 3, 2009.

FIELD OF THE INVENTION

The invention relates to accessories for portable electronic devices such as cellular phones or PDA devices. The invention relates more particularly to holsters for carrying such devices.

BACKGROUND OF THE INVENTION

The expanding use of portable electronic devices, such as cellular telephones, personal digital assistant devices, digital cameras, and MP3 and other digital audio players, has brought about a number of carrying cases, most notably device holsters. The holsters typically are sized to accommodate one or more different sized devices and include some type of fastener, such as clip, to fasten the holster to a belt, pocket, bag strap or other article carried or worn by the user.

These holsters employ different techniques for securing the device, such as snug fit or a flap to cover the opening of the holster. The placement of the opening sometimes makes it difficult to insert or retrieve the device, particularly, when worn at the waist on a belt. Some holsters provide a rotating clip that allows the user to reorient the holster to facilitate insertion and retrieval. However, such rotating clip can also present the danger that the holster is rotated inadvertently through user movement to dump the device out of the holster onto the ground.

Further, holsters have primarily functioned as storage and carrying devices. Many allow access to power and data ports on the devices, but typically through openings in the holster side walls to allow cord access to the ports. Some holsters have solar cell charging surfaces integrated on to the carrier exterior surfaces, but the interfaces to supply the power to the devices can be cumbersome and detract from the primary function of ease of insertion and retrieval into the holster as a storage device.

What is needed is a holster system that solves the problem of providing power supply capabilities in a portable holster environment while maintaining the ease of use of the holster and providing the ability to additionally offer other connections, such as audio, data and device controls.

SUMMARY OF THE INVENTION

It is an object of the invention to provide storage and back up power improvements to portable electronic device holsters.

It is another object of the invention to provide an interface for reliably and readily connecting a portable electronic device to power sources while making insertion and retrieval into the holster easy and convenient.

It is a further object of the invention to enable the holster to operate as a stand alone docking station that enables the device to be connected to a host computer or other data exchanging device.

It is still another object of the invention to provide clean, on-the-go, back-up and emergency power for a device when the primary power in the device is depleted or there is no convenient electrical outlet available to recharge the device.

These and other objects of the invention are achieved by holster systems incorporating features according to aspects of the invention. For example, a holster for a portable electronic device can include a carrier having at least two spaced apart side walls and a base joining the two side walls to provide a storage space for a portable electronic device. The carrier can be a hard case or soft pouch. A fastener, such as a clip, can be mounted to an outside of the carrier for attaching the carrier to an article, such a belt, clothing, back pack or other item. The holster provides a docking station mounted inside the device storage space of the carrier and has electrical contacts for interfacing with electrical contacts of a portable electronic device. The holster further includes two spaced apart guide rails extending from the docking station for engaging sides of a portable electronic device and guiding it into electrical contact with the docking station.

According to further aspects of the invention, the docking station is pivotally mounted to the carrier so that the docking station and guide rails can pivot relative to the carrier. As a result, a portable electronic device can be more easily and reliably inserted into and removed from the docking station. At least one of the guide rails can be adjustably connected to the docking station so that the spacing between the guide rails can be selectively changed to accommodate portable electronic devices of different sizes. Further, at least one of the guide rails can provide a releasable lock for locking the docking station and guide rails in the stored position.

According to further aspects of the invention, the docking station can further provide a power source contact for connecting to a power source to supply power to a portable electronic device connected to the docking station. For example, the holster can include photovoltaic cells mounted on an outside of the carrier and connected to the power source contact of the docking station. The photovoltaic cells can be provided on one or more sheets mounted in a stack, with one of the sheets retractably sliding out relative to the other sheet in a charging position. The holster can also include a battery electrically connected to the power source contact for storing power received from the photovoltaic cells and electrically connected to the docking station electrical contacts for supplying power to a portable electronic device when connected to the docking station. The battery is preferably located in the docking station.

The docking station is preferably pivotally mounted to the carrier through a pivot hinge and the photovoltaic cells can be electrically connected to the docking station through pivot hinge. The photovoltaic cells can be arranged on a sheet that is provided on a surface of the carrier. The photovoltaic cells can be arranged on at least two sheets, and one sheet can slide out to enlarge the charging surface area.

Apart from the solar panel example, the docking station can provide a power source contact for connecting to other power sources to supply power to a portable electronic device when connected to the docking station, and can provide a battery for storing a charge to be provided as needed to a portable electronic device in the carrier. Other possible power sources include a wireless charging panel mounted to the carrier and electronically connected to the power source contacts of the docking station or a power cord that connected to a wall charger or the like. The holster can include an array of side wall electrical contacts on at least one of the carrier side walls for contacting the power source contact of the docking station or guide rail as it pivots relative to the carrier. The array of side wall electrical contacts can be electrically connected to one or more power sources, such as photovoltaic cells, a wireless charging pad and a power cord receptacle for transferring electrical power to the docking station. The carrier side wall and the docking station or a guide rail can also include an array of detents for securing the docking station in two or more pivoted positions relative to the carrier.

The docking station can serve as a pass-through to the portable electronic device. The docking station can provide a power electrical contact to connect to a cord of a power supply to pass through power to a portable electronic device when connected to the docking station. The docking station can provide a data electrical contact to connect to a data transmission cord to pass through data signals to a portable electronic device when connected to the docking station. The docking station can also provide audio electrical contacts for receiving audio signals from a portable electronic device when connected to the docking station and one or more audio loudspeakers built into the docking station for projecting sound responsive to the audio signals. Further, the docking station can include a power switch for turning a portable electronic device connected to the docking station on and off, a power management controller for switching connection between two or more sources of power and a portable electronic device connected to the docking station, and power control indicator lights.

BRIEF DESCRIPTION OF THE DRAWINGS

A further understanding of aspects of the invention can be gained from the following detailed description of embodiments of the invention together with a review of the accompanying drawings, in which:

FIG. 6 is a side elevation view of an alternative embodiment of a holster according to aspects of the invention, equipped with a solar panel power supply having a retractable second panel;

FIG. 7 is a side elevation view of another alternative embodiment of a holster according to aspects of the invention, equipped with a solar panel power supply having a sliding top panel;

DETAILED DESCRIPTION OF EXEMPLARY EMBODIMENTS

Figure 1:
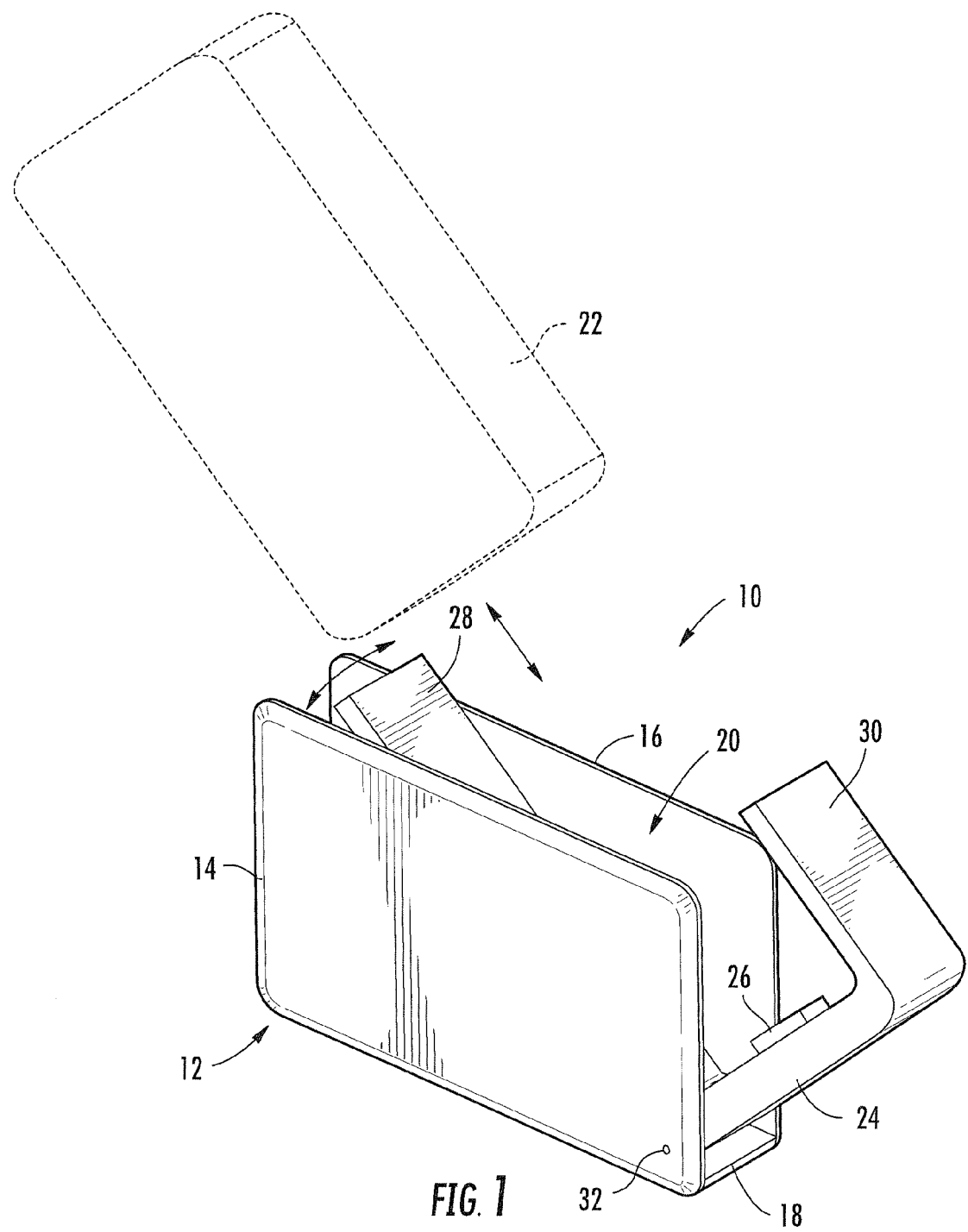
FIG. 1 is a perspective view of an embodiment of a holster according to aspects of the invention.

Referring to FIG. 1, one embodiment of a holster 10 having features according to aspects of the invention is shown. The holster 10 can include a carrier 12 having at least two spaced apart side walls 14, 16 and a base 18 joining the two side walls 14, 16 to provide a storage space 20 for a portable electronic device 22, such as a cellular phone, personal digital assistant or a digital audio device, to name a few examples. The holster 10 can also include a docking station 24 having electrical contacts for interfacing with electrical contacts of a portable electronic device 22. The electrical contacts can be provided, for example, through a multi-contact port 26, that can interface with a matching port on the device 22. The docking station 24 can be mounted to the carrier 12 in the storage space 20. Two spaced apart guide rails 28, 30 can extend from the docking station 24 for engaging sides of a portable electronic device 22 and guiding it into electrical contact with the docking station port 26. The guide rail surfaces can be shaped, for example, with U-shaped curvature to facilitate guiding of the device 22. One guide rail 30 can be shorter than the other guide rail 28 to facilitate loading and retrieval.

The docking station 24 is pivotally mounted to the carrier 12, such as through a hinge 32, so that the docking station 24 and guide rails 28, 30 can pivot relative to the carrier 12. As a result, engagement and disengagement of a portable electronic device 22 with the guide rails 28, 30 and docking station 24 can be facilitated.

As discussed more fully below, the side walls 14, 16 of the carrier 12 can be equipped with power supply features. For example, the side walls 14, 16 can support photo-voltaic cell panels. Alternatively, a wireless magnetic charging system can be integrated into a side wall to supply power to a matching charging tag built into the device 22.

Figure 2:
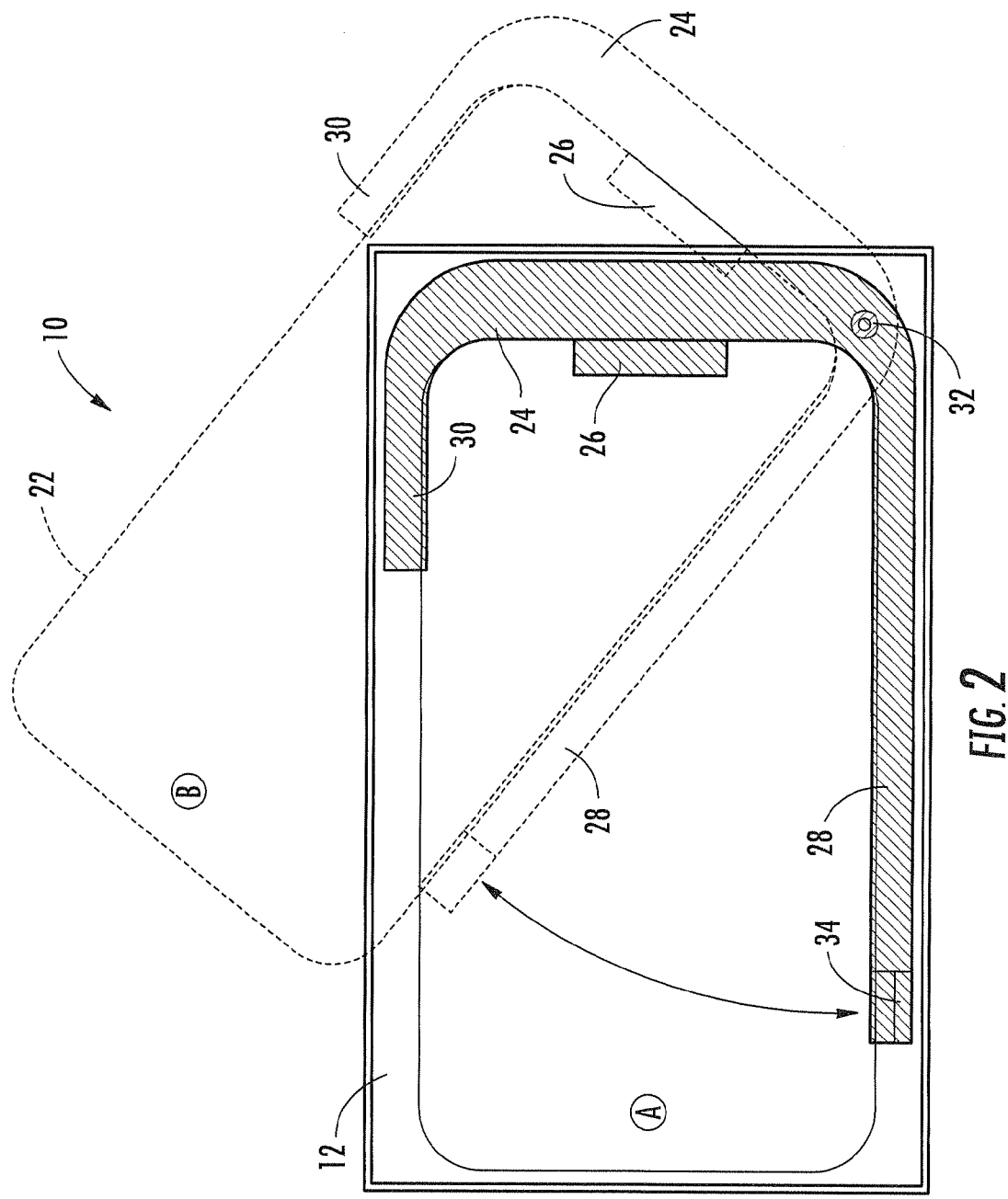
FIG. 2 is front elevation view of the holster embodiment shown in FIG. 1.

Referring to FIG. 2, the docking station 24 and guide rails 28, 30 can pivot between a stored position A and an access position B. The holster 10 can be equipped with a lock 34 for holding the guide rails 28, 30 and docking station 24 in the stored position A. The lock 34 can be released, for example, by pressing down on the device 22 to depress the lock 34 relative to the carrier 12. The lock assembly 34 can also include a spring to propel the guide rails 28, 30 towards the access position B when the lock 34 is depressed and released. Upon return of the guide rails 28, 30 and docking station 24 to the stored position A, the lock 34 can again be depressed to return to a locked, secure mode. Various spring-loaded lock assemblies for accomplishing this feature are known and can be used for this application.

Figure 3:
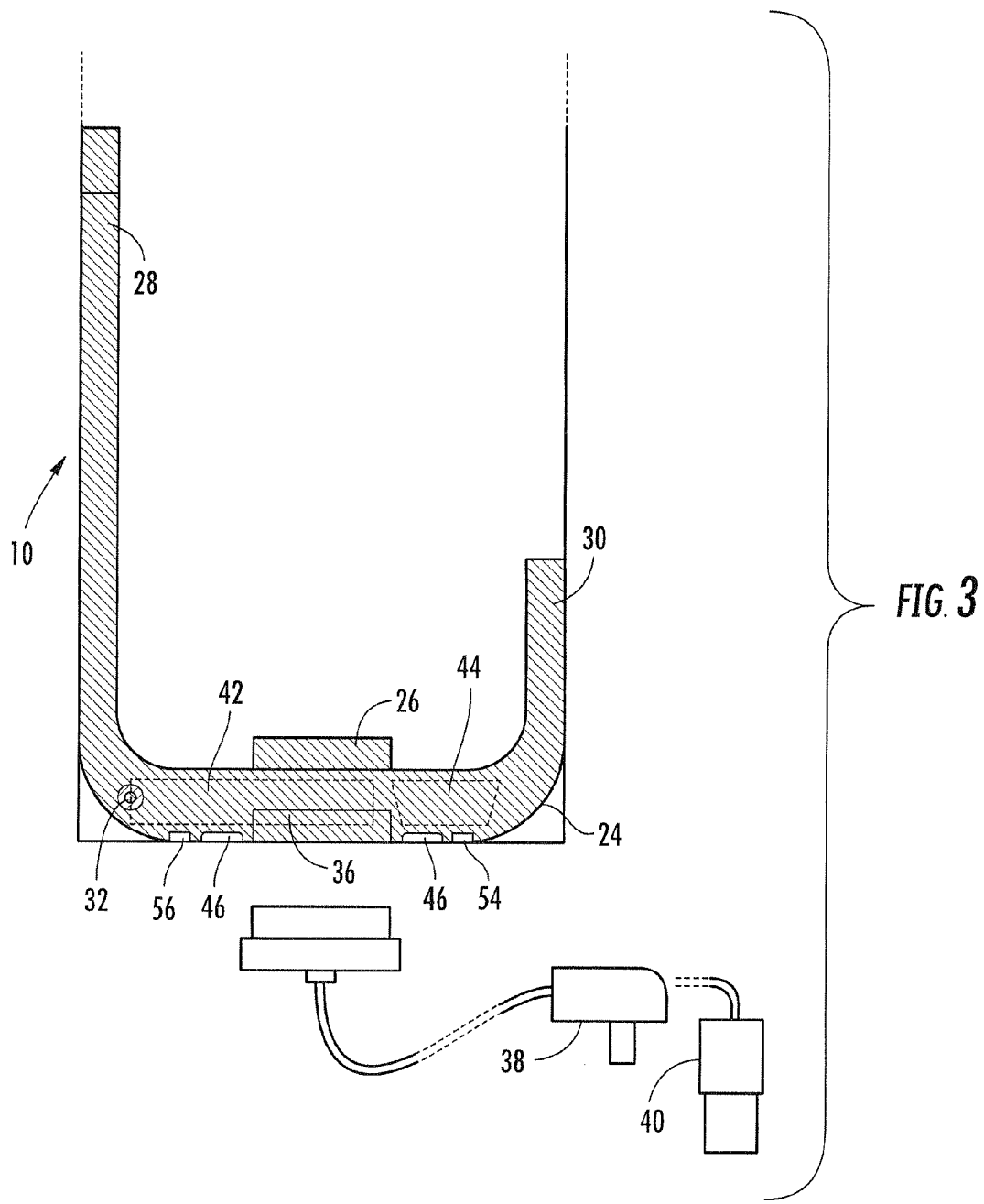
FIG. 3 is a detailed portion of a docking station in the holster embodiment shown in FIG. 1.

Referring to FIG. 3, the docking station 24 can provide a number of features to the holster 10. The power and data connector port 26 can be linked to a pass-through connector 36 for plugging in an AC charger cable 38 and/or a USB cable 40 for charging or data transfer. The docking station 24 should include a built-in battery 42, such as a rechargeable lithium-ion battery, for storing a charge from an external source, such as the AC charger 38 and/or from photovoltaic cell panels mounted on the carrier (see FIG. 4). The docking station 24 can also provide a power management controller 44 to allow the user to select between power sources, such as the AC charging source 38 or photovoltaic cell panels. Further, the docking station 24 can be equipped for audio transmission, either through openings to allow transfer of sound from speakers in the docked device, or audio speakers 46 built into the docking station 24 for transmitting sound based on audio signals from the attached device. The base of the docking station 24 can include power control lights 54 to indicate, for example, the power level in the docked device, charging status, or which charging source is being used. A power switch 56 for turning a connected device on and off can also be provided.

Figure 4:
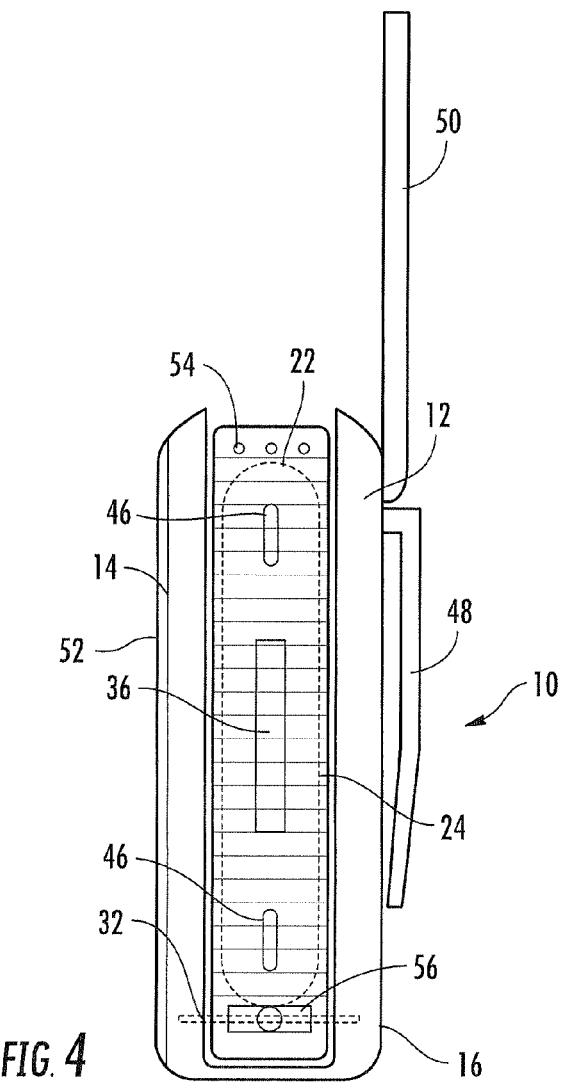
FIG. 4 is a side elevation view of the holster embodiment shown in FIG. 1.

Referring to FIG. 4, the carrier 12 can include a fastener, such as a clip 48, for securing the holster 10 to a user's clothing, such as a belt or pocket lining, or to a portable case or pack. The carrier 12 can also provide a flap 50 to removably cover the top opening of the carrier 12 for additional securing of the device 22. The carrier 12 can provide a panel of photo-voltaic cells 52 on its front side wall 14. Optionally, the back side wall 16 can include a wireless charging pad for transferring charge to a matching charging tag provided on the device. Speaker openings or speakers 46 can be provided. The docking station 24 can also provide the pass-through connector 36 for data and charging cable connections. The hinge 32 for pivotally connecting the docking station 24 to the carrier 12 can also provide a conduit for electrical lines between the docking station 24 and any associated photo-voltaic cell panels 52 or other charging panels on the carrier 12.

Figure 5:
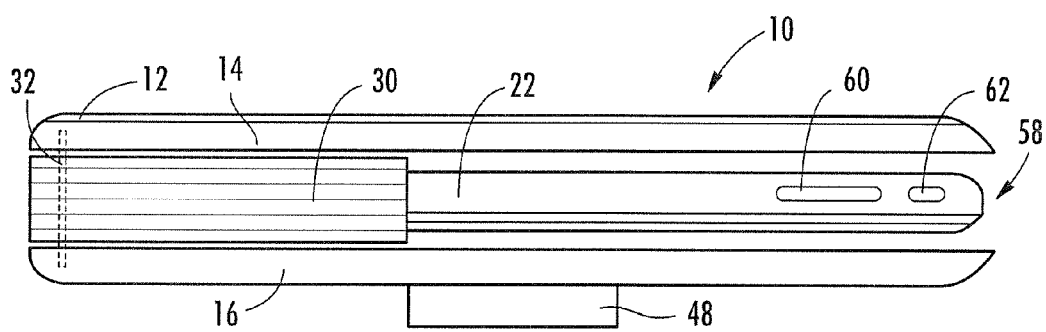
FIG. 5 is a top plan view of the holster embodiment shown in FIG. 1.

Referring to FIG. 5, which shows a top view of an exemplary holster 10, the carrier 12 can provide an open region 58 to the side of the docking station 24 and guide rail 30. In this region, access to functions 60, 62 on the device can be provided.

Referring to FIG. 6, the charging surface area of the photo-voltaic cell panels 52 can be increased by providing multiple panels 64, 66 in a stacked arrangement. As shown in FIG. 6, a second panel 66 can be nested below a first panel 64 and pulled out for charging and retracted to a stored position when not in use. The electrical charge from the panels 64, 66 can be connected along conductive contact rails or strips in accordance with known techniques. Alternatively, as shown in FIG. 7, a first panel 64 on top of the stack can slide to charge position, revealing a second panel 66 below.

Figure 8:
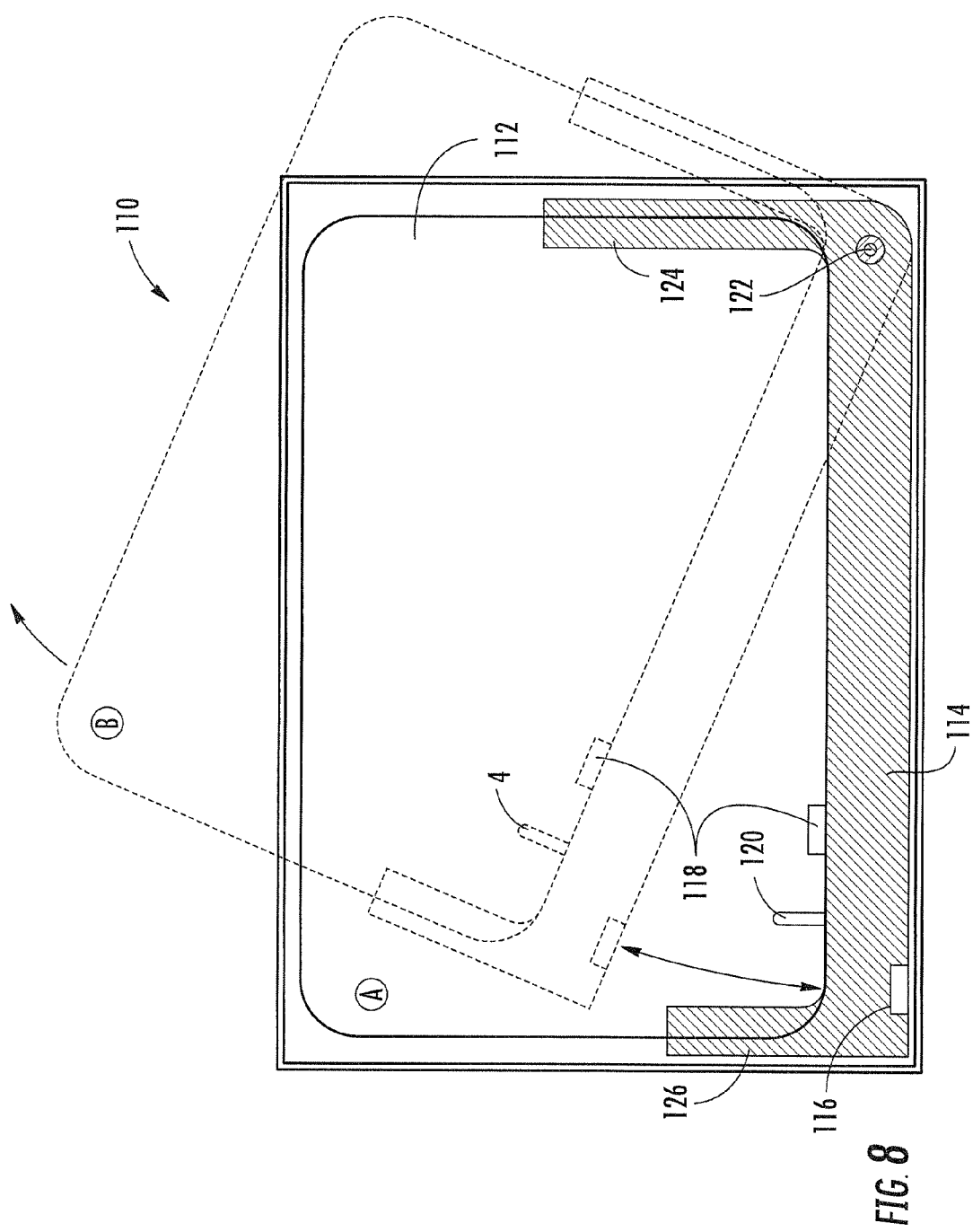
FIG. 8 is a front elevation view of an alternative embodiment of a holster according to aspects of the invention, having a docking station arranged to connect to a device with side contacts.

FIG. 8 shows an alternative holster 110 for storing devices 112 having charging and data ports on a side of the device, rather than the base of the device. The docking station 114 can include a spring loaded, lockable release 116 as discussed earlier in connection with the embodiment shown in FIG. 2. Also, a power/data connection port 118 can be provided, as well as an audio connection plug 120 for interfacing with matching ports on the device 112. The docking station hinge 122 can also provide connection to charging sources such as photo-voltaic cell panels. The docking station 114 can include guide rails 124, 126.

Figure 9:
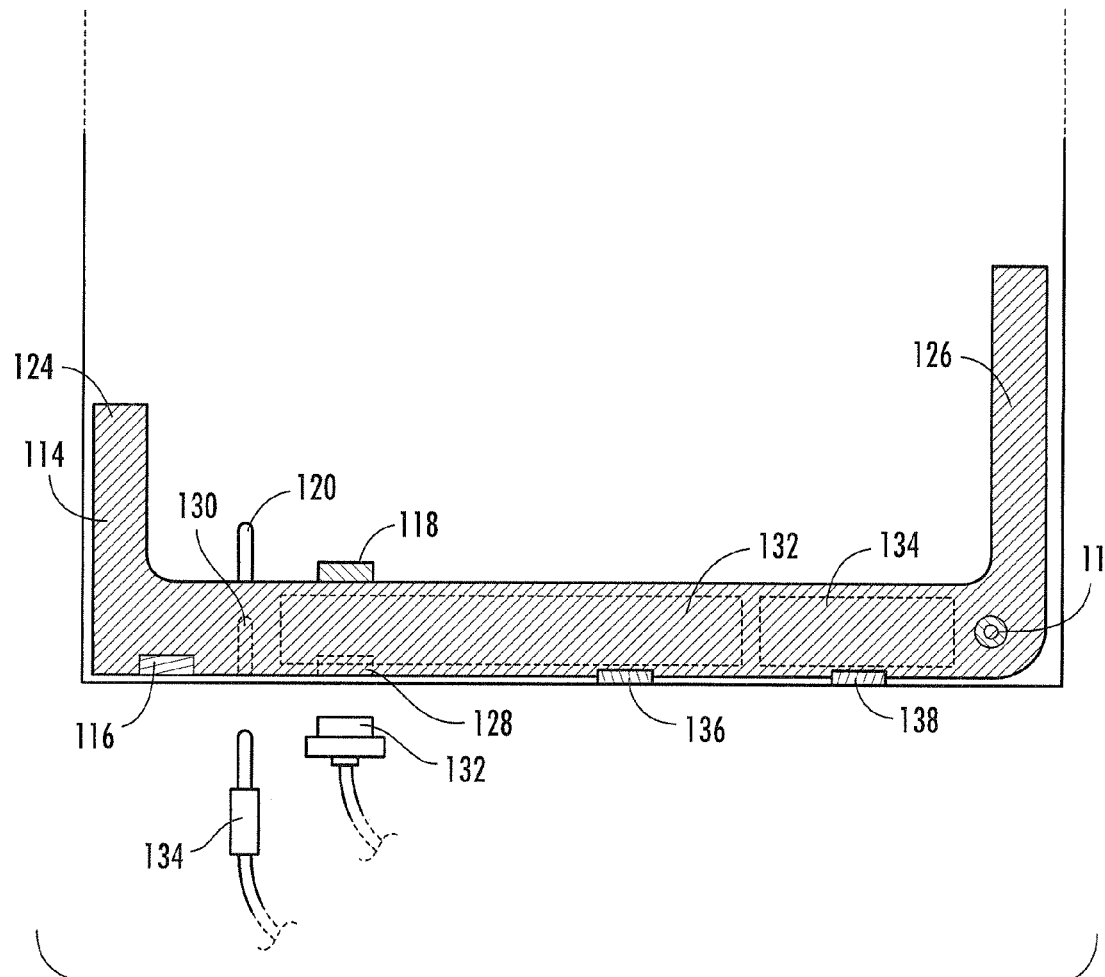
FIG. 9 is a detailed portion of a docking station in the holster embodiment shown in FIG. 8.

As shown in FIG. 9, the docking station 114 for side mounted devices 112 can include the guide rails 124, 126 and releasable lock 116, power/data connectors 118 and audio connector 120, and pass-through connectors 128, 130 for connection to data and power cables 132 and to ear phones 134. The docking station 114 can include a built-in battery 132, power management controller 134 for selecting a charging or power source, a power switch 136 and power control or energy level indicator lights 138.

Figure 10:
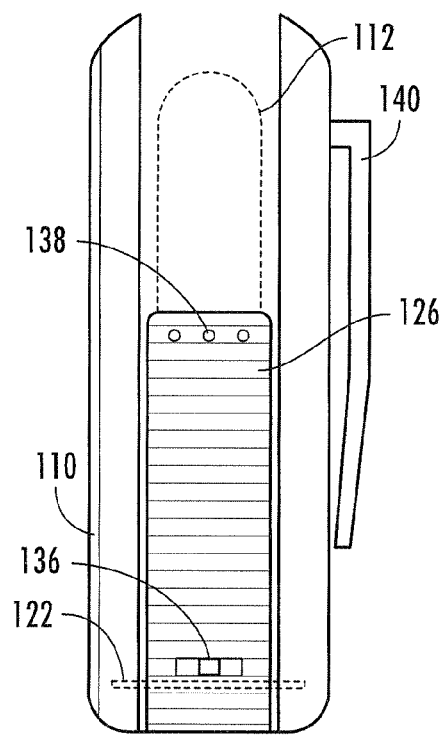
FIG. 10 is a side view of the holster embodiment shown in FIG. 8.

In FIG. 10, the side mounted holster 110 can include fastener, such as a belt clip 140 (which may be removable). The power control lights 138 and/or power control switch 136 may alternatively be located on a guide rail 126 as shown.

Figure 11:
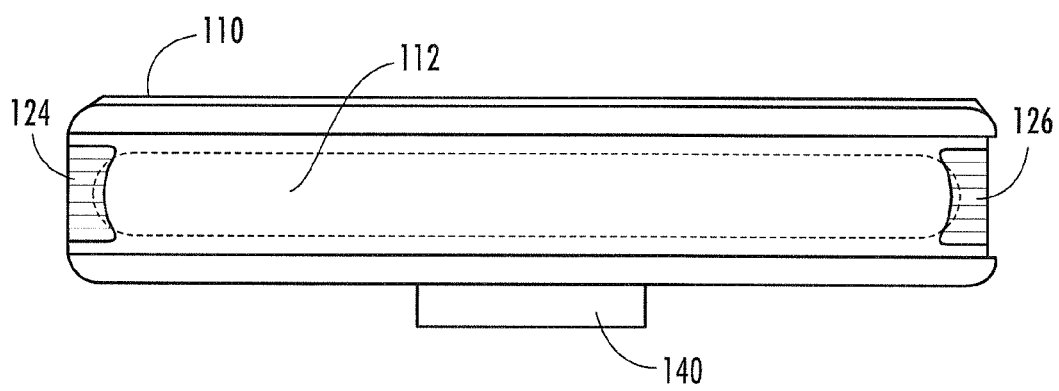
FIG. 11 is a top view of the holster embodiment shown in FIG. 8.

Referring to FIG. 11, the top of the carrier 110 may be open to facilitate access to the pivoting docking station to release the device 112. The guide rails 124, 126 can provide curved surfaces, to facilitate insertion and removal of the device 112.

Figure 12:
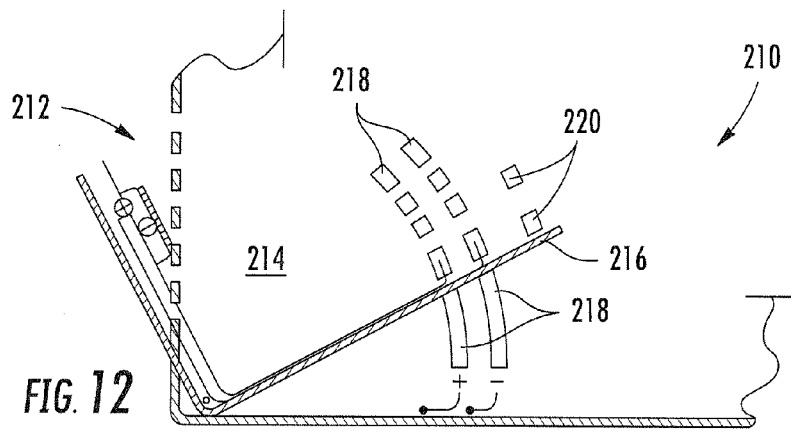
FIG. 12 is a side view detail of a section of a docking station, guide rail and side wall, showing a through rail contact system.
Figure 13:
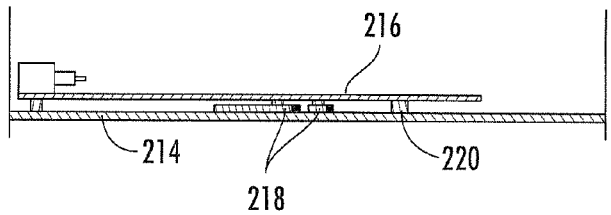
FIG. 13 is top view of the through rail contact system shown in FIG. 12.

Referring to FIGS. 12 and 13, a holster 210 according to aspects of the invention can optionally include a through rail contact system 212. Electrical connection to charging panels (not shown) on the carrier side wall 214 can be provided through the guide rail 216. The side wall 214 can provide a series of contact surfaces 218 arranged in an arc to match the path of contacts provided on the guide rail 216 as it rotates through its range of motion from access position to stored position. Additionally, the side wall 214 can provide detents 220 for securing the guide rail 216 at discrete locations in its range of motion and limiting the rotation to the full access position.

Figure 14:
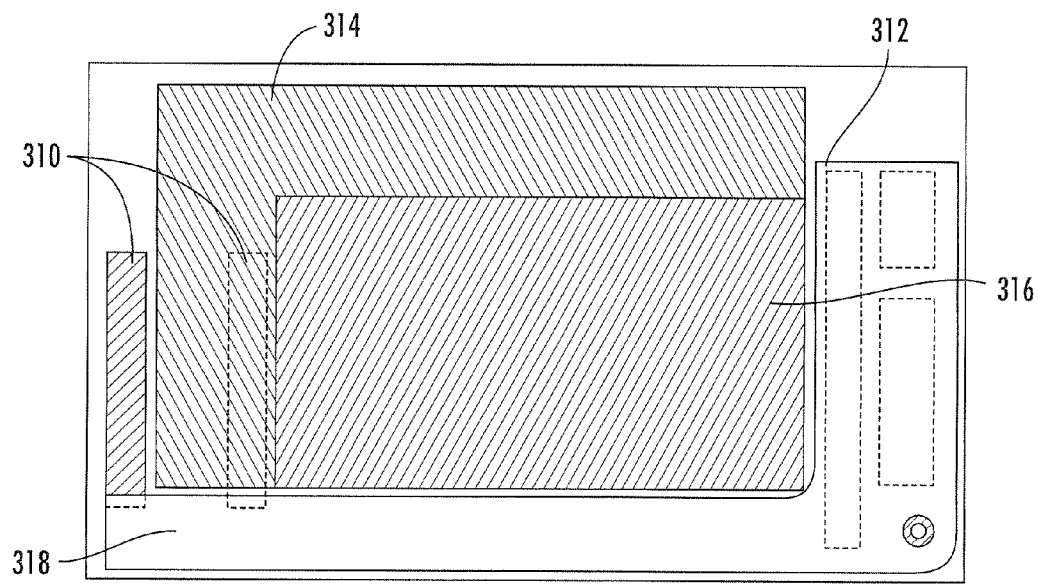
FIG. 14 is a side view of an alternative embodiment of a holster according to aspects of the invention having an adjustable guide rail.

As shown in FIG. 14, one of the guide rails 310 can be adjustable to allow the guide rails 310, 312 to accommodate devices 314, 316 of different sizes. The guide rail 310 can be slidingly mounted to a base 318 secured in location by a detent or other position securing technique. This arrangement is particularly suitable for devices using wireless charging tags that can connect to the carrier through a wireless interface.

Figure 15:
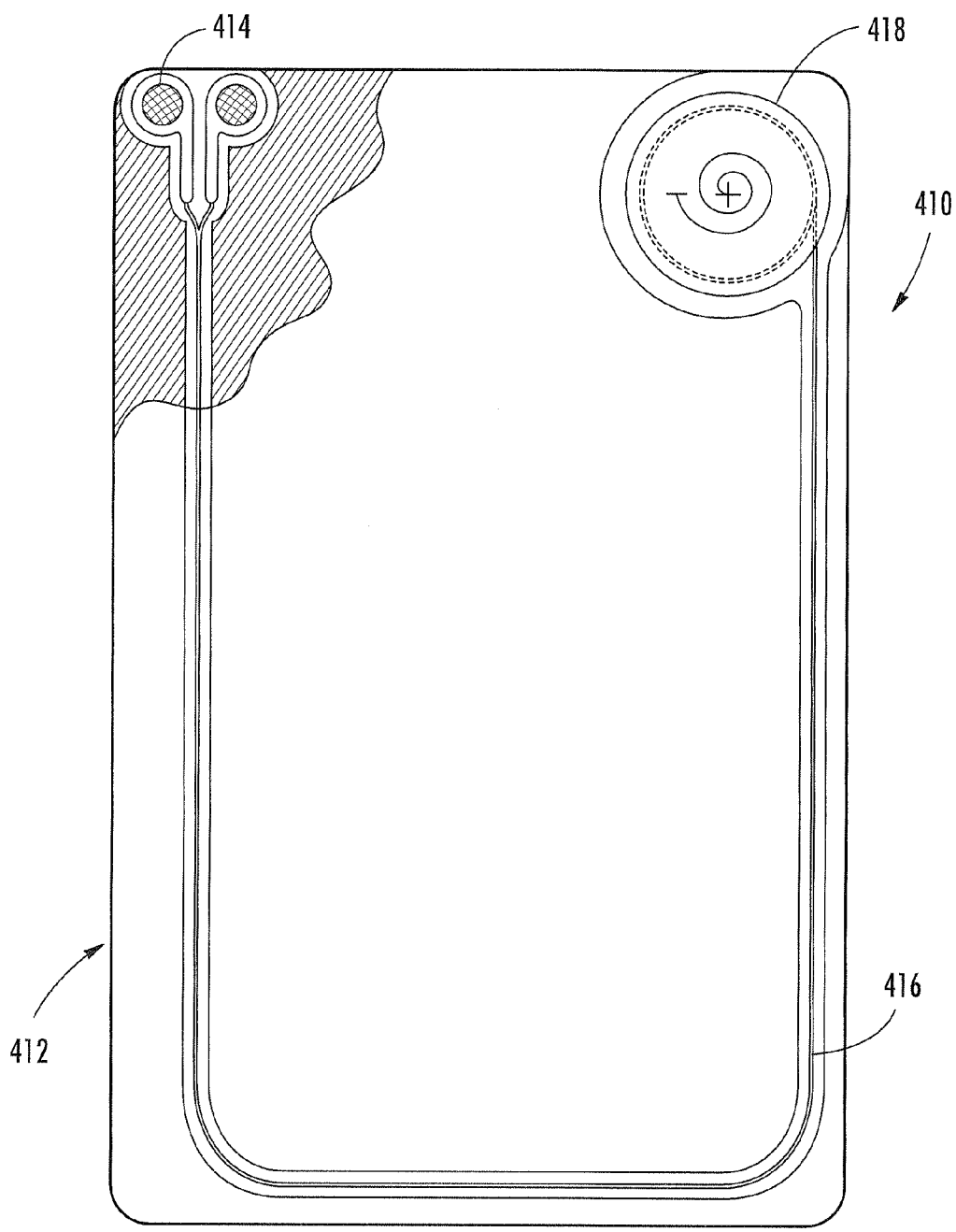
FIG. 15 is a front sectional view of an alternative embodiment of a holster according to aspects of the invention in which a pair of earphones is stored with a retractable cord.

FIG. 15 shows an additional feature that can be included in a side wall 412 of a holster 410. A pair of ear phones 414 and the associated cable 416 can be stored in a recess in the side wall 412. The cable 416 can be retractably stored on a spring loaded take-up spool 418 with a releasable ratchet detent. A first pull can be used to remove the cable 416 and a second pull to release the ratchet hold and allow the spring loaded spool 418 to pull the cable 416 back to the stored position.

While details of preferences are set forth in this description and the associated drawings, these details are considered only examples, and the scope of the invention is to be determined by the following patent claims.

I claim:

1. A holster for a portable electronic device, comprising:
   a carrier having at least two spaced apart side walls and a base joining the two side walls to provide a storage space for a portable electronic device;
   a fastener mounted to an outside of the carrier for attaching the carrier to an article;
   a docking station having electrical contacts for interfacing with electrical contacts of a portable electronic device, said docking station being mounted to said carrier in said storage space;
   two spaced apart guide rails extending from said docking station for engaging sides of a portable electronic device and guiding it into electrical contact with the docking station.

2. The holster of claim 1, wherein the docking station is pivotally mounted to the carrier so that the docking station and guide rails can pivot relative to the carrier, whereby engagement and disengagement of a portable electronic device with the guide rails and docking station can be facilitated.

3. The holster of claim 1, wherein at least one of the guide rails is adjustably connected to the docking station so that the spacing between the guide rails can be selectively changed to accommodate portable electronic devices of different sizes.

4. The holster of claim 1, further comprising a lock for releasably holding the guide rails and the docking station in a stored position inside the carrier.

5. The holster of claim 1, wherein the docking station further provides a power source contact for connecting to a power source to supply power to a portable electronic device connected to the docking station.

6. The holster of claim 5, further comprising photovoltaic cells mounted on an outside of the carrier and connected to the power source contact of the docking station and further comprising a battery electrically connected to the power source contact for storing power received from the photovoltaic cells and electrically connected to the docking station electric contacts for supplying power to a portable electronic device when connected to the docking station.

7. The holster of claim 6, wherein the docking station is pivotally mounted to the carrier through a pivot hinge and the photovoltaic cells are electrically connected to the docking station through pivot hinge.

8. The holster of claim 6, wherein the photovoltaic cells are arranged on a sheet.

9. The holster of claim 8, wherein the photovoltaic cells are arranged on at least two sheets.

10. The holster of claim 9, wherein the sheets are stacked in a stored position and one of the sheets slides from the stack to a charging position.

11. The holster of claim 1, wherein the docking station further provides a power source contact for connecting to a power source to supply power to a portable electronic device when connected to the docking station and further comprising a battery located inside the docking station for storing and supplying power to a portable electronic device connected to the docking station.

12. The holster of claim 11, further comprising a wireless charging pad mounted to a sidewall of the carrier and electronically connected to the power source contacts of the docking station.

13. The holster of claim 1, further comprising an array of side wall electrical contacts on at least one of the carrier side walls for electrically contacting the one of guide rails and the docking station as they pivot relative to the carrier, said array of side wall electrical contacts being electrically connected to a photovoltaic cells.

14. The holster of claim 13, further comprising an array of detents for securing the docking station in two or more pivoted positions relative to the carrier.

15. The holster of claim 1, wherein the docking station provides a power electrical contact to connect to a cord of a power supply to pass through power to a portable electronic device when connected to the docking station.

16. The holster of claim 1, wherein the docking station provides a data electrical contact to connect to a data transmission cord to pass through data signals to a portable electronic device when connected to the docking station.

17. The holster of claim 1, wherein the fastener is a clip.

18. The holster of claim 1, wherein the docking station has audio electrical contacts for receiving audio signals from a portable electronic device when connected to the docking station and further comprising an audio loudspeaker built into the docking station for projecting sound responsive to the audio signals.

19. The holster of claim 1, wherein the docking station further includes at least one of a power switch for turning a portable electronic device connected to the docking station on and off; a power management controller for switching connection between two or more sources of power and a portable electronic device connected to the docking station; and power control indicator lights.

20. The holster of claim 1, further comprising retractable earphones and audio cable and a spring loaded take up spool housed in a side wall of the carrier.

* * * * *